United States Patent
Boylan et al.

(10) Patent No.: US 9,152,965 B2
(45) Date of Patent: Oct. 6, 2015

(54) METHOD AND DEVICES FOR INTER-TERMINAL PAYMENTS

(75) Inventors: Cornelius Boylan, Geilenkirchen (DE); Ralf Keller, Wuerselen (DE); Guido Zavagli, Tokyo (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 4258 days.

(21) Appl. No.: 10/201,186

(22) Filed: Jul. 23, 2002

(65) Prior Publication Data
US 2003/0028484 A1 Feb. 6, 2003

(51) Int. Cl.
| | |
|---|---|
| *G06Q 40/00* | (2012.01) |
| *G06Q 20/10* | (2012.01) |
| *G06Q 20/42* | (2012.01) |
| *G06Q 20/02* | (2012.01) |
| *G06Q 20/04* | (2012.01) |
| G06Q 20/36 | (2012.01) |
| G06Q 50/22 | (2012.01) |
| G06F 3/00 | (2006.01) |
| G06F 13/00 | (2006.01) |
| H04N 7/173 | (2011.01) |
| H04N 7/16 | (2011.01) |
| H04N 5/445 | (2011.01) |

(52) U.S. Cl.
CPC ............. *G06Q 20/42* (2013.01); *G06Q 20/02* (2013.01); *G06Q 20/04* (2013.01); *G06Q 20/10* (2013.01); *G06Q 20/102* (2013.01)

(58) Field of Classification Search
USPC ........................................................ 705/40
See application file for complete search history.

(56) References Cited

U.S. PATENT DOCUMENTS

| | | | | |
|---|---|---|---|---|
| 5,220,501 | A | * | 6/1993 | Lawlor et al. ................... 705/40 |
| 5,563,783 | A | * | 10/1996 | Stolfo et al. ...................... 705/8 |
| 5,920,847 | A | * | 7/1999 | Kolling et al. .................. 705/40 |
| 6,070,151 | A | * | 5/2000 | Frankel ........................ 705/36 R |
| 6,408,284 | B1 | * | 6/2002 | Hilt et al. ......................... 705/40 |
| 7,003,495 | B1 | * | 2/2006 | Burger et al. ................... 705/50 |

(Continued)

FOREIGN PATENT DOCUMENTS

| | | |
|---|---|---|
| EP | 1003139 A | 5/2000 |
| EP | 1093097 A2 | 4/2001 |
| WO | WO 97 08643 A | 3/1997 |

OTHER PUBLICATIONS

Hecht, Ronny; "Servicing difficult loans"; Jul. 1999; Mortgage Banking; vol. 59, starting p. 84.*

(Continued)

*Primary Examiner* — Muriel Tinkler
(74) *Attorney, Agent, or Firm* — Roger S. Burleigh

(57) ABSTRACT

A method for inter-terminal payment and corresponding devices and computer programs loadable into said devices is disclosed. The method comprises a transfer of financial value from a payment device of a payer (PDPr) to a payment device of a payee (PDPe) with the assistance and the supervision of a trusted third party (TTP). Payment relevant data of the payee is transmitted to the payment device of the payer (PDPr) which triggers the transaction of financial value at the trusted third party (TTP) by a message. The trusted third party (TTP) releases a payment confirmation for the payer and the payee providing a status information on the financial transaction for the payer and the payee, respectively, and sends this information in a confirmation transmission procedure to the payment device of the payer (PDPr) and the payment device of the payee (PDPe), respectively.

14 Claims, 3 Drawing Sheets

(56) References Cited

U.S. PATENT DOCUMENTS

| | | | | |
|---|---|---|---|---|
| 7,076,458 | B2* | 7/2006 | Lawlor et al. | 705/35 |
| 7,333,953 | B1* | 2/2008 | Banaugh et al. | 705/40 |
| 7,822,688 | B2* | 10/2010 | Labrou et al. | 705/67 |
| 2002/0023055 | A1* | 2/2002 | Antognini et al. | 705/40 |
| 2002/0059139 | A1* | 5/2002 | Evans | 705/40 |
| 2002/0087445 | A1* | 7/2002 | Kaniwa et al. | 705/35 |
| 2003/0004874 | A1* | 1/2003 | Ludwig et al. | 705/40 |

OTHER PUBLICATIONS

Avidon, Eric; "How to set prices for subservicing B&C quality martgages"; Apr. 1, 1996; National Mortgage News; vol. 20; startin p. 22.*

Glenn, Gwendolyn; "Small and midsized firms wrestle with servicing decision"; Feb. 22, 1999; Real Estate Finance Today; vol. 16; starting p. 7.*

Staples, Ed; "Secondary markets explore securitizing service fees"; Apr. 29, 1996; Vol13; starting at p. 3.*

Gilkeson, James et al; "Buy, sell, or hold? Valuing cash flows from mortgage lending"; Nov. 1994; vol. 79; starting at p. 1.*

Print-out from internet page, http://www.mondex.com; Aug. 1, 2001, pp. 1-6.

Print-out from internet page, http://www.paybox.de; Aug. 1, 2001, pp. 1-23.

European Search Report, Application No. EP 01 11 8650, Feb. 18, 2002, pp. 1-3.

* cited by examiner

METHOD AND DEVICES FOR INTER-TERMINAL PAYMENTS

TECHNICAL FIELD OF THE INVENTION

The present invention relates to the field of electronic commerce, especially to a method for payment transactions from a payer to a payee with the assistance of a trusted third party, to payment devices, and to computer programs loadable into the corresponding payment devices.

BACKGROUND OF THE INVENTION

Electronic commerce (E-commerce) has gained significant attraction as it provides a way to become independent from cash. To adequately replace cash, three basic services have to be provided by an E-commerce system: retrieving money from a bank account into an electronic purse, paying with the money from the electronic purse, and transferring money from one electronic purse to another electronic purse. The latter service is also known as a peer-to-peer transaction. An electronic purse can be implemented as an electronic payment device like a smart card or a mobile phone.

The public acceptance of E-commerce will further grow if electronic payment mechanisms with services as described above will be further developed to ensure and to enhance security aspects and availability aspects. Security aspects cover all items related to transferring or exchanging of financial value over insecure transaction paths, e.g. open networks like the Internet or fixed or wireless telephone networks, and to prevent an E-commerce system from fraud, e.g. by tampering electronic payment devices or automatic teller machines (ATMs). Availability aspects are aiming for E-commerce systems providing services being accessible from a maximum number of locations and ideally at any time with special emphasis on compatibility, e.g. of the payment services or payment devices. In addition, a status information about the financial transaction should be accessible to all parties involved, ideally immediately after the payment has taken place. Implementation of E-commerce services within a mobile communication network, e.g. the Global System for Mobile communication (GSM), is known as mobile E-commerce or M-commerce.

Electronic payment systems known so far provide the functions retrieving money from a bank account and paying. The service of peer-to-peer transactions is implemented into some E-commerce systems already. However, the peer-to-peer transaction functionality imposes strong requirements on the system in order to ensure security and availability and the payment procedure is still very laborious.

A smart card based payment system implementing the concept of an electronic purse with peer-to-peer functionality is Mondex (see http:\\www.mondex.com). The owner of such a card may reload it at an ATM or via phone and later spend the money either in a shop or transfer financial value directly to another Mondex card. As in the case of cash, electronic money can be transferred between an unlimited number of cards. However, the fundamental problem with Mondex-like implementations is that is impossible to trace fraud in the case someone is capable of generating electronic money on a smart card.

An application of E-commerce is home or online banking. It provides a user access to banking functions via a personal computer (PC) or a smartphone with chip card reader connected to the banking server via the Internet or a telecommunication network. Among other two-party applications, e.g. bank account monitoring, electronic payment transactions from a bank account of a payer to a bank account of a payee can be conducted. For this case, the user acting as payer contacts his banking server and provides the bank with data comprising e.g. name, bank identifier and account number of the recipient of the financial transfer and the amount of money to be transferred. The payer activates the payment transaction and after successful verification of the user's authentication, the bank executes the payment transaction and generates a payment confirmation for the payer.

In order to achieve a high level of security and compatibility, common standards for online banking emerge. An example is the Home Banking Computer Interface (HBCI) which is nowadays the de-facto standard for online banking in Germany. The HBCI-based home banking application uses the European Conference of Posts and Telecommunications (CEPT) protocol and Einheitliche Höhere KommunikationsProtokoll (EHKP) as transport frame for transparent data up to 1600 Byte accompanied by Bildschirmtext File Interchange Format (BtxFIF) for data larger than 1600 Byte. For Internet clients, HBCI additionally uses the Transmission Control Protocol/Internet Protocol (TCP/IP). TCP-Port 3000 serves as interface between application and communication. HBCI utilises a data format based on the United Nations Electronic Data Interchange For Administration, Commerce and Transport (UN/EDIFACT) which is used also for internal data transfer at the banks.

A benefit of HBCI is its high level of end-to-end security even over an open network as the Internet, because the HBCI standard fulfils the requirements of authentication of the user to the user terminal, e.g. by entering a password, mutual authentication of the user terminal and the banking system, non-repudiation of origin, integrity, encryption, and validity check in order to prevent a replay attack. Two different security solutions are offered in HBCI: the first one is a method named DES-DES-Verfahren (DDV) based on a symmetric Data Encryption Standard (DES) method employing a chip card. The second solution is the RSA-DES-Verfahren (RDV) based on an asymmetric Rivest, Shamir and Adleman (RSA) algorithm. In the DDV solution, an electronic context signature is established in detail by first hashing the message via 160-bit cryptographic hash function (RIPEMD-160), followed by a padding of the hash value to a length equalising the next multiple of 8 byte by adding "00", and finally building a retail Cipher Block Chaining Message Authentication Code (CBC-MAC) according to American National Standards Institute (ANSI) X9.19 standard using the 2-Key-Triple DES encryption method. In the RDV solution, the electronic signature is established by the same hashing procedure as in DDV. In addition, the hash value is formatted and finally signed via RSA algorithm following International Standards Organization (ISO) 9796:1991 standard. Encryption of the message content is achieved in both security solutions via 2-Key-Triple-DES according to ANSI X3.92 standard using a specific session key. For each message, a new session key is generated dynamically by the sending system. The session key itself is encrypted according to DDV or RDV and accompanies each message. At the receiving party, the authentication takes place by checking the electronic signature with the secret or public key of the sending party according to DDV or RDV, respectively. Validity is achieved via the implementation of a sequence counter in the banking system as well in the user terminal combined with a history function, e.g. a list of previously executed sequences.

Another online or home banking standard is the Interactive Financial eXchange (IFX) standard customised for the American market. IFX originates from the Open Financial eXchange (OFX) and Gold standard. In IFX, the data format is eXtensible Markup Language (XML) and transport protocols employed are TCP/IP, Hypertext Transfer Protocol (HTTP), System Network Architecture (SNA), and XML. Security is ensured via authentication mechanisms on the server and cryptography method is via Secure Sockets Layer (SSL) and Personal Identification Number (PIN).

Beside its major advantages of providing a high degree of availability and security, online banking remains up to now a two-party process because it does not directly involve the payee. This party is generally not informed about a payment transaction nor the status and has to contact its bank for checking if a payment transaction has been conducted. Another drawback is that the time needed for the bank to credit the money to the account of the payee can last up to several days or even more. This long time delay makes this payment method inconvenient for peer-to-peer functionality in E-commerce especially for the payee.

An alternative approach of an electronic purse offering peer-to-peer transactions is provided by paybox (see http://www.paybox.de). In this E-commerce payment system, the payer utilises a mobile phone connected to a mobile telephone network to enable financial transactions with a payee, e.g. Internet-merchants, stationary retailers, mobile service providers, and end-consumers. The E-commerce payment system provider is involved in the financial transactions and acts as trusted third party. This system uses existing payment schemes, e.g. payment by direct debit including direct debit authorisation, and combines this method with a confirmation function simultaneously provided to the participants via mobile phone. The handling of payments is carried out by a financial service company, which is accredited to conduct said financial transactions, e.g. a bank. For gaining access to the full set of offered services including peer-to-peer financial transactions, the payer must be fully registered to said E-commerce payment system.

Although the use of a mobile phone as payment device in combination with a mobile communication network and a trusted third party provides a substantial improvement with respect to both, availability and security aspects, such E-commerce payment systems have some limitations: the payer has to call the payment system provider and to manually type in authorisation data and payment relevant data of the payer and the payee necessary to execute the payment transfer. This manual interaction is time consuming and susceptible to errors. Fees are charged by the operator of the mobile network for the complete duration of the mobile connection thus producing high cost per payment transaction. Another, severe shortcoming is the laborious confirmation procedure: for the case, that also the payee is registered to the E-commerce payment system, payment confirmation messages are sent to the payer as well to the payee via the mobile telephone network. For the case the payee is not registered to the E-commerce payment system, the payee must be directly contacted and be informed that the payer wants to send money to him. This is done by the payment system sending a Short Messaging System (SMS) message via the mobile telephone network. For executing the payment transaction, the payee has to contact the E-commerce payment system either via the Internet or via a phone call. This confirmation procedure is tedious and the additional connections further increase the cost per payment.

SUMMARY OF THE INVENTION

It is an object of the present invention to provide an improved method, payment devices and corresponding computer programs allowing peer-to-peer transactions of financial value from a payer to a payee, which are secure, convenient, and affordable.

In the proposed method, financial value is transferred from a payer to a payee with the assistance of a trusted third party. The payer as well as the payee use payment devices for receiving and transmitting messages, which is also applicable to the trusted third party. Those messages comprise information needed for the exchange of user specific data, for the activation of the payment transaction as well as for the confirmation of the payment transaction. Consequently, the payment devices incorporate the functionality of processing messages, e.g. in order to generate a new message or to extract information from a message. Said messages can be transmitted via one or more wireless links providing a maximum of mobility and/or wired connections, e.g. the Internet or a telephone network like the Public Switched Telephone Network (PSTN) or the Integrated Services Digital Network (ISDN). Preferably, the extracted information is accessible to the user of the recipient device. This can be achieved for example by displaying the information on a screen, by printing it out on a printer, or voice output.

The payment device of the payee performs a generation of a payee information message. This message comprises payment relevant data of the payee for the further payment transaction and confirmation transmission procedure. Preferably, the data format of the payee information message is adapted to allow a direct electronic processing by the payment device of the payer, e.g. in order to integrate information into further messages. A transmission of the payee information message is carried out from the payment device of the payee to the payment device of the payer. The payment device of the payer performs a generation of a payment initialisation message which is needed to provide the trusted third party with information in order to execute the payment transaction from an account of the payer to an account of the payee and with information in order to initialise the confirmation transmission procedure for the payment confirmations for the payer and the payee. The payment initialisation message contains payment relevant data of the payer and the payee. Payee-related payment information may be taken fully or in part from the payee information message whereas payer-related payment information may be entered manually by the payer or derived from a memory, e.g. located within the payment device of the payer. It depends on the individual implementation or case, which information is contained in the payment initialisation message. A transmission of the payment initialisation message is performed from the payment device of the payer to the trusted third party. At the trusted third party, the received payment initialisation message is processed. As a result, the trusted third party activates the execution of the payment transaction of the financial value from the account of the payer to the account of the payee. In addition, the trusted third party performs a generation of a payment confirmation for the payer and a payment confirmation for the payee comprising the status of the financial transaction for the payer and the payee, respectively. In a confirmation transmission procedure, the payment confirmation for the payer and the payee are transmitted to the payment devices of the payer and the payee, respectively.

In the proposed payment method, a trusted third party is involved in order to execute the transaction of financial value and the subsequent payment confirmation procedure relies on payment confirmations for the payer and the payee that are generated by said trusted third party. The individual financial transaction is traceable thus providing a high level of security for both the payer as well the payee compared to other E-commerce systems which provide peer-to-peer functionality but lacking of a supervision and control of a trusted third party. The method provides a substantial improvement with respect to data entry procedure being more convenient and less susceptible to errors. No communication between the payee and the trusted third party is required for the activation of the financial transaction thus minimising communication effort and generally lowering cost per payment.

According to a preferred embodiment, the trusted third party performs a generation of a combined payment confirmation message. In this message, the payment confirmation for the payer and the payment confirmation for the payee are integrated. Subsequently, a transmission of the combined payment confirmation message is carried out from the trusted third party to the payment device of the payer. The received combined payment confirmation message is processed by the payment device of the payer and the payment confirmation for the payer comprising status information of the payment transaction for the payer is extracted. Preferably, payee-related content of this message, e.g. the payment confirmation for the payee, is not accessible for the payment device of the payer. The payment device of the payer performs a generation of an indirect payment confirmation message for the payee comprising the payment confirmation for the payee. The term "indirect" refers to the specific transmission path on which the payment confirmation for the payee is transferred. Instead of transmitting the payment confirmation for the payee directly from the trusted third party to the payment device of the payee, it is sent on an indirect way via the payment device of the payer. The indirect payment confirmation message for the payee can contain supplementary information, e.g. the payment confirmation for the payer. Furthermore, the indirect payment confirmation message for the payee can be a copy of the combined payment confirmation message thus minimising processing effort on the payment device of the payer. Subsequently, a transmission of the indirect payment confirmation message for the payee is performed from the payment device of the payer to the payment device of the payee. The received message is processed by the payment device of the payee and the payment confirmation for the payee is extracted. Preferably, payer-related content of this message, e.g. the payment confirmation for the payer, is not accessible by the payment device of the payee. An advantage of this confirmation transmission procedure is that the trusted third party does not have to communicate with the payment device of the payee thus simplifying the payment method and lowering the cost per payment transaction.

According to a preferred embodiment of the method, the trusted third party adopts a security mechanism to the combined payment confirmation message in order to provide the payee with a reliable payment confirmation for the payee and to avoid that the payer tampers with the combined payment confirmation message. The trusted third party concatenates the payment confirmation for the payer with the payment confirmation for the payee such that the relationship between both payment confirmations can be verified by both the payer and the payee. The linkage is achieved by a hashing digest of the concatenation including both payment confirmations. The hash value can be included into the combined payment confirmation message or can accompany the message.

According to an alternative embodiment of the confirmation transmission procedure, the trusted third party generates separate payment confirmation messages for the payer and the payee and transmits the corresponding messages to the payment device of the payer and the payee, respectively. The payment confirmation for the payer comprising status information of the financial transaction for the payer is included in a payment confirmation message for the payer, and accordingly, the payment confirmation for the payee comprising status information of the financial transaction for the payee is included in a direct payment confirmation message for the payee. The payment confirmation message for the payer and the direct payment confirmation message for the payee are transmitted to the payment device of the payer and the payment device of the payee, respectively, where the messages are processed and the related payment confirmations are extracted such that the status information for the payer and the status information for the payee are accessible to the payer and the payee, respectively. This embodiment of the confirmation transmission procedure can inherently achieve a very high level of security, because both the payee as well as the trusted third party do not have to rely on the payer with respect to the transmission of the payment confirmation for the payee to the payment device of the payee.

According to a preferred embodiment of the method, the payment initialisation message complies with a banking standard like the Home Banking Computer Interface (HBCI) standard, the Open Finance Exchange (OFX) standard, or the Interactive Financial Exchange (IFX) standard. Also other existing or future banking standards can be used for increasing the security of the payment method. Another advantage of the use of a banking standard is the wide acceptance in the public thus simplifying the introduction or implementation of such a method.

Preferably, the method applies an encryption to at least one of the messages or parts of the messages or confirmations, i.e. a message or confirmation can be sent encrypted and a received message or confirmation can be decrypted. Both, symmetric as well as asymmetric encryption can be used. Accordingly, information contained in a single message can be encrypted in different ways, e.g. the payment confirmation for the payer and the payment confirmation for the payee comprised in the combined payment confirmation message are preferably encrypted differently in order to prevent the payer to get access to the payment confirmation for the payee and vice versa. The security of the method can be enhanced by applying an electronic signature to at least one of the messages or parts of the messages or confirmations. For authentication at the receiving device, both symmetric as well as asymmetric methods can be used and one or more public or session keys can accompany one or more of the messages.

Preferably, the application of hashing, encryption and electronic signature are combined for extended protection. The following two examples may serve to illustrate this statement: In a first embodiment, the trusted third party generates a hash value of the payment confirmation for the payer and a separate hash value of the payment confirmation for the payee and subsequently encrypts the hash values with public keys of the payer and the payee, respectively. Finally, it signs both hash values with a secret or private key of the trusted third party. In a second embodiment, the trusted third party encrypts the payment confirmations of the payer and the payee with public keys of the payer and the payee, respectively, concatenates the encrypted payment confirmations, generates a hash value of the concatenation and finally signs the hash value with a private or secret key of the trusted third party. The individual steps described can be arranged in a different sequence or can be repeated, e.g. generating first a hash value of individual payment confirmations for the payer and the payee and a second hash value of the concatenation of the payment confirmations. In addition, multi-level encryption can be applied. Generally, the application of encryption or electronic signature enhances the security of the method by making the individual message or confirmation readable only for the intended recipient being either the payer or the payee or the trusted third party, authenticating a message at the receiving device, and avoiding a fraudulent falsification of a message or confirmation by one of the parties.

One or more of the messages can be sent over a mobile communication system, e.g. GSM or the Universe Mobile Telecommunication System (UMTS). In a preferred embodiment of the method, the payment initialisation message and the payment confirmation messages for the payer and the payee can be transmitted in such a way. Carrying out messaging via a mobile communication network is very convenient especially for the payer and the payee. Within the coverage range of the mobile communication network, payer and payee can choose virtually any place in order to execute the payment transaction. In addition, communication via an operator-run network like GSM or UMTS is generally better protected compared to open networks like the Internet.

One or more of the messages can be sent over an InfraRed (IR) link or a Bluetooth link, e.g. to reduce cost, to enhance security or to use such a link as access to a network. Preferably, the messages between the payment device of the payer and the payment device of the payee are sent via such a link. Also messages to or from the trusted third party can be transmitted via IR or Bluetooth.

The payment confirmation comprises a status information of the payment transaction. Such a status information can be an indication whether the payment transaction was erroneous, successful, or processed, e.g. when the payment transaction has failed, the payment transaction has been successful, or is still ongoing, respectively. An example for the latter case is that the money was successfully debited from the bank account of the payer with the money to be credited to the bank account of the payee. The individual implementation may vary from case to case, but an immediate and trustworthy access to the status information of the payment transaction makes the method more secure. Especially the payee may feel safer if provided with a payment confirmation before handing out a contract good to the payer.

Correlatively, the present invention also concerns devices for executing the payment transaction method. The devices can be adapted to all embodiments of the method as described before.

A first device that can be operated by the payer comprises a transmitter for sending messages, a receiver for receiving messages, and a processing unit for processing of information and messages. Generally, the information may originate from a message, from a memory located within the payment device or connectable to the payment device, or by direct input, e.g. data typed into the device by the user. Processing of information covers items like managing the data input/output with respect to the processing unit, like analysing data, e.g. for consistency or completeness, or like modifying data, e.g. for compiling information from different sources into a set of information required for a specific message or arranging information such that it complies with a specific data format, e.g. compliant with HBCI. The receiver is adapted to receive the payee information message comprising payment relevant data of a payee. Preferably, the processing unit is adapted to analyse the information contained in said payee information message. Furthermore, the processing unit is adapted to perform a generation of a payment initialisation message comprising payment relevant data of the payer and the payee for activating a payment transaction. The transmitter is adapted to send the payment initialisation message to a trusted third party and the receiver is adapted to receive a confirmation message comprising a payment confirmation for the payer indicating the status of the payment transaction for the payer. The processing unit is adapted to perform an extraction of the payment confirmation for the payer from that confirmation message.

A second device that can be operated by the payee comprises a transmitter for sending messages, a receiver for receiving messages, and a processing unit for processing of information and messages. The processing unit is adapted to perform a generation of a payee information message comprising payment relevant data of the payee. The transmitter is adapted to send the payee information message to a payment device of a payer and the receiver is adapted to receive a confirmation message comprising a payment confirmation for the payee indicating a status of the payment transaction for the payee. The processing unit is adapted to perform an extraction of the payment confirmation for the payee from that confirmation message.

The trusted third party as a third device comprises a transmitting unit adapted to send messages, a receiving unit adapted to receive messages, a processing unit adapted to process information and messages, and a unit for financial transactions adapted to execute a transaction of financial value from an account of a payer to an account of a payee. The receiving unit is adapted to receive a payment initialisation message comprising payment relevant data of the payer and the payee. The processing unit is adapted to process the received payment initialisation message and to activate the execution of a payment transaction according to the payment initialisation message by the unit for financial transactions. Furthermore, the processing unit is adapted to generate a payment confirmation for the payer indicating a status information of the payment transaction for the payer and a payment confirmation for the payee indicating a status information of the payment transaction for the payee. Generally, the payment confirmation for the payer and the payee are generated according to a confirmation from the unit for financial transactions. A very efficient way is to simply forward the confirmation originating from the unit of financial transactions into the payment confirmation for the payer and/or the payee. Furthermore, the processing unit is adapted to integrate the payment confirmation for the payer and the payment confirmation for the payee into a combined payment confirmation message and the transmitting unit is adapted to send the combined payment confirmation message to a payment device of the payer.

The processing unit and the unit for financial transactions do not necessarily have to be included in a single device. Instead, the transmitting unit, the receiving unit, and the processing unit may belong to a first server of a service provider having an agreement with an operator of the unit for financial transactions belonging to a further server, e.g. to a banking server. Thus, on the receipt of the payment initialisation message, the processing unit located on the first server can generate an activation message for activating the execution of the payment transaction at the unit for financial transactions located on the further server. Depending on the implementation, the unit for financial transactions can respond with status information on the payment transaction that can be included into the payment confirmations for the payer and the payee on the first server. Alternatively, the processing unit on the first server may generate status information on its own, e.g. an indication that the activation message was successfully sent, and include this status information into the payment confirmations for the payer and the payee.

The devices can be especially used in the above method. The payment devices of the payer and the payee can be different from each other or identical. In a preferred embodiment, both the payer and the payee utilise a mobile phone as payment device. The method can be implemented flexibly to allow that the payer may act as payee or the payee may act as payer, e.g. in a further payment transaction. Consequently, the payment devices of the payer or the payee preferably incorporate also the functionality of the payment device of the payee or the payer, respectively.

The present invention also concerns one or more computer programs loadable into the processing unit of the corresponding devices. The computer programs comprise portions of software codes in order to implement the steps of the method as described above when operated on the corresponding payment device.

The computer program loadable into a processing unit of a payment device especially of a payer can be adapted to execute the steps of analysing a payee information message comprising payment relevant data of a payee, generation of a payment initialisation message comprising payment relevant data of the payer and the payee for activating a payment transaction at a trusted third party, and extraction of a payment confirmation for the payer from a confirmation message with the payment confirmation for the payer indicating a status information of the payment transaction for the payer. The computer program can be further adapted to execute a generation of an indirect payment confirmation message for the payee from the confirmation message received from the trusted third party with the indirect payment confirmation message for the payee comprising a payment confirmation for the payee indicating a status information of the payment transaction for the payee.

The computer program loadable into a processing unit of a payment device especially of a payee can be adapted to execute a generation of a payee information message comprising payment relevant data of the payee and an extraction of a payment confirmation for the payee from a confirmation message with the payment confirmation for the payee indicating a status information of a payment transaction for the payee.

The computer program loadable into a processing unit especially of a trusted third party can be adapted to perform the steps of processing a payment initialisation message comprising payment relevant data of a payer and a payee, activating the execution of a payment transaction from an account of the payer to an account of the payee at a unit for financial transactions, generation of a payment confirmation for the payer indicating a status information of the payment transaction for the payer and a payment confirmation for the payee indicating a status information of the payment transaction for the payee, and integration of the payment confirmation for the payer and the payment confirmation for the payee into a combined payment confirmation message.

Preferably, the computer programs for the payer and the payee comprise similar functionality or are even identical, enabling the payer to act as payee or the payee to act as payer provided that the payment devices of the payer or the payee support such functionality. The computer programs for the payer and the payee are preferably embodied in one or more payment applications adapted to operate on the payment devices of the payer and the payee, respectively. The computer program for the trusted third party can be embodied in an additional payment application adapted to execute the steps of the trusted third party.

According to a preferred embodiment, the computer programs can be stored on a computer-readable medium, possibly removable, incorporated or not in the corresponding payment devices. The computer-readable medium can be a permanent or rewritable memory within the corresponding device or located externally. The computer program can be transferred in the latter case into the corresponding payment device e.g. over a wireless link or a cable.

In the following, detailed embodiments of the present invention shall be described in order to give the skilled person a full and complete understanding. However, these embodiments are illustrative and not intended to be limiting, as the scope of the invention is defined by the appended claims.

DETAILED DESCRIPTION OF THE INVENTION

Figure 1:
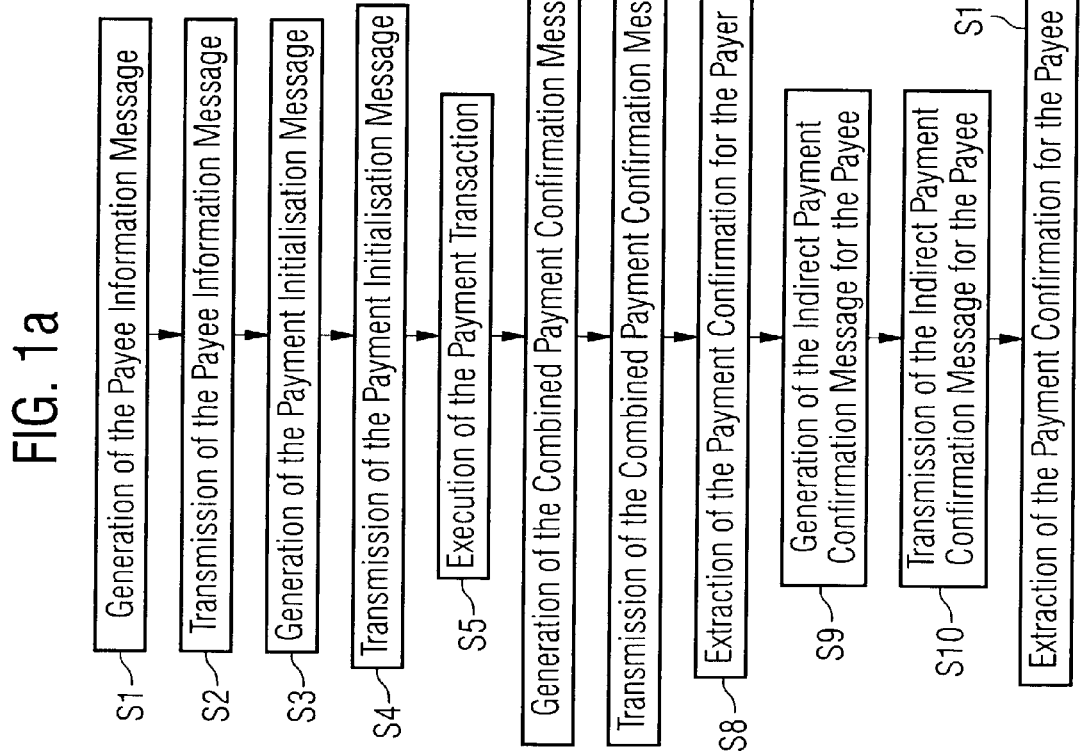
FIG. 1a shows a flow-chart diagram of a first embodiment of the present invention.
FIG. 1b shows messages and processes of the first embodiment of the present invention.

The following description of the embodiments focuses on the steps for carrying out the invented method. Depending on the implementation or case, it may be advantageous to integrate additional steps, e.g. that one or more of the steps must be confirmed by either the payer, the payee or the trusted third party TTP before the corresponding step is carried out. One or more pre-initialisation steps can be incorporated into the method in order to ensure the interoperability of the devices.

Furthermore, the following examples shall be described in the context of the payment device of the payer PDPr and the payment device of the payee PDPe being terminals connectable to a mobile communication network, e.g. a mobile phone connected to a GSM or UMTS network. However, it may be noted that the present invention is applicable also to other interconnection technologies, e.g. the Internet or fixed telephone networks as PSTN or ISDN. Communication between the individual devices can also be achieved even via dedicated wired networks, e.g. simply by connecting the payment device of the payer PDPr to the payment device of the payee PDPe by a cable. A high number of interconnection techniques and combinations of interconnection techniques is possible. In addition, it is important to emphasise, that the method is not restricted to payment devices being mobile terminals. For example, the payment device of the payee PDPe can be a stationary vending machine.

The present invention is based on a scenario, wherein solely the payment device of the payer PDPr is intended to communicate with the trusted third party TTP in order to activate the transaction of financial value from the account of the payer to the account of the payee. The information needed to execute this payment transaction is typically not fully available at the trusted third party TTP or the payment device of the payer PDPr. It is therefore necessary to establish a subsequent flow of information providing first the payment device of the payer PDPr with payment relevant data of the payee comprising e.g. banking-specific data of the payee but also additional information required for the subsequent payment confirmation procedure and in a second step to transmit these payer-and payee-related information to the trusted third party TTP.

A first example for a payment transaction of financial value from a payer to a payee according to the present invention is depicted in FIGS. 1a and 1b. FIG. 1a shows a flow chart of the method whereas FIG. 1b reveals the corresponding processes and message flows between the payment device of the payee PDPe, the payment device of the payer PDPr and the trusted third party TTP.

In a first step of the method, the payment device of the payee PDPe performs a generation of a payee information message S1. This can be triggered by the payee or by a request from the payment device of the payer PDPe. It depends on the individual implementation or case, which information is contained in the payee information message, but it can be one or more items from a group comprising the name of the payee, the name of a bank of the payee, the bank identifier of the corresponding bank, a bank account number of the payee, the amount of money to be transferred from the payer to the payee, a device number of the payment device of the payee PDPe, a subscription number, e.g. a Mobile Station ISDN (MSISDN) number, of the payee, or supplementary data, e.g. notes for easier archival storage of the payment transaction. In addition, the message can also contain a public key of the payee, e.g. for implementing encryption schemes into the method for enhancement of security.

In a second step, a transmission of the payee information message S2 is performed from the payment device of the payee PDPe to the payment device of the payer PDPr. Preferably, the communication between both devices takes place via an IR or Bluetooth link. This has the advantages, that the transmission of data is free of charge compared to mobile communication networks as GSM or UMTS and is generally more convenient compared to wired connections.

After successful receiving this message, the payment device of the payer PDPr performs the generation of a payment initialisation message S3 comprising information necessary for providing the trusted third party TTP with information needed to activate the execution of the payment transaction S5 and the subsequent confirmation transmission procedure. Optionally, this message can comprise also routing information. Again, it depends on the individual implementation or case which information is comprised in the message, but it could be one or more items from a group comprising the name of the payer and/or the payee, the name of a bank of the payer and/or the payee, the bank identifier of the bank of the payer and/or the payee, a bank account number of the payee and/or the payer, the amount of money to be transferred from the payer to the payee, a device number of the payment device of the payer PDPr and/or the payment device of the payee PDPe, a subscription number, e.g. MSISDN, of the payer and/or the payee, or even supplementary data of the payer and/or the payee. In order to enhance the security of the payment method, an implementation of a banking standard is recommended which also enhances the acceptance of the E-commerce system in the public. For example, the payment initialisation message can be generated according to the HBCI requirements. Other standards as IFX or ODX or future standards allowing a broader coverage or improved security can also be used.

In a fourth step, a transmission of the payment initialisation message S4 is performed from the payment device of the payer PDPr to the trusted third party TTP, preferably via a wireless link provided by a mobile communication network although other interconnection techniques can be used. For example, if the payment device of the payer PDPr and the trusted third party TTP are located within the communication range of a common Bluetooth cell, it can be advantageous to send messages between the payer and the trusted third party TTP via Bluetooth. Alternatively, the trusted third party TTP can have access, e.g. via wired networks as the Internet of PSTN or ISDN, to one or more Bluetooth communication points in order to exchange Bluetooth messages.

Typically, the payment initialisation message is a self-contained unit which can be sent within a dialog between the payment device of the payer PDPr and the trusted third party TTP. Such dialog can comprise the steps of an initialisation of a dialog, a transmission of the payment initialisation message S4, and an end of the dialog. Typically, the dialog is executed synchronously, e.g. each step comprising a message originating from the payment device of the payer PDPr is acknowledged by a confirmation message by the trusted third party TTP before a new message can be sent by the payment device of the payer PDPr. The initialisation of the dialog can accomplish the authentication of both parties and ensures that the payment initialisation message is transmitted in a secure environment. Within the initialisation of the dialog, the parties can mutually agree on encryption or compression procedures. After successful initialisation of the dialog and transmission of the payment initialisation message S4, the end of dialog message confirms, that all previous messages have been transmitted in a complete and correct manner. Depending on the implementation or case, also more than one payment initialisation message can be sent within one dialog. Obviously, also other messages of the proposed method can be transmitted in a dialog. In addition, also other messages or information can be included into the dialog dedicated for transmission of the payment initialisation message S4. For example, it may be advantageous to transmit the payment confirmation for the payer and/or the payment confirmation for the payee in said dialog in order to simplify the method or to safe cost. Alternatively, owing to the mutual trust relationship between the payer and the trusted third party, the indication of a successful transmission of the payment initialisation message S4, e.g. by the end of dialog message, can be sufficient evidence for the payer that the payment transaction will be executed correctly. The indication of the successful transmission of the payment initialisation message S4 may serve as payment confirmation for the payer and may supersede an extra transmission of the payment confirmation for the payer to the payment device of the payer PDPe. The successful transmission of the payment initialisation message S4 can be indicated on the payment device of the payer PDPe.

The trusted third party TTP processes the received payment initialisation message and analyses its content, e.g. for completeness or consistency. It may be necessary to request additional information before initialising the transaction. This information may be derived from a memory located at the trusted third party TTP or from an external source. Based on the data comprised in the payment initialisation message and optionally additional information, the trusted third party TTP activates the execution of the payment transaction S5 of financial value from the account of the payer to the account of the payee and generates a payment confirmation for the payer and a payment confirmation for the payee indicating the status of the payment transaction for the payer and the payee, respectively. This information can be, but is not limited to, a status indicating an erroneous processing, e.g. if the payment transaction failed, or a successful processing, e.g. if the payment transaction has taken place and the money has been successfully credited to the account of the payee, or a status indicating a further processing, e.g. when the money is debited from the account of the payer but is not yet credited to the account of the payee. Especially, inter-bank transfer of money lasts up to several days, which is too long for most peer-to-peer transaction applications where immediate information on the status of the payment transaction is demanded.

In the next step, the trusted third party TTP performs the generation of a combined payment confirmation message S6 comprising the payment confirmation for the payer and the payment confirmation for the payee. In order to ensure that the information contained in this message can be read out by the intended recipient only, e.g. the payment confirmation for the payer only by the payer and the payment confirmation for the payee only by the payee, or to avoid that the payer or payee tamper with the confirmations, the trusted third party TTP can adopt a security mechanism. In a preferred security mechanism, the payment confirmation for the payer is concatenated with the payment confirmation for the payee and a hashing digest of the concatenation is generated from that linkage. Each part of the message is secured against tampering if an encryption mechanism is applied. This makes the message readable to the intended recipient and ensures integrity, authenticity and non-repudiation of origin, e.g. by digitally signing the message or one or more parts of the message. Whether symmetric or asymmetric cryptography is used in this context depends on the specific realisation. The hash value is preferably integrated into the combined payment confirmation message.

Next, the transmission of the combined payment confirmation message S7 from the trusted third party TTP to the payment device of the payer PDPr is performed. As in the case of the payment initialisation message, this transmission is preferably achieved via a link provided by a mobile communication network although other interconnection techniques are feasible.

At the payment device of the payer PDPr, the combined payment confirmation message is processed and the extraction of the payment confirmation for the payer S8 is performed. Ideally, the payment device of the payer PDPr provides one or more means to indicate the status of the payment transaction to the payer, e.g. displaying the information on a screen where the payer can read the information, an output by voice, or optical indicators arranged to indicate the status of the payment transaction. In addition, a printer may be attached to the payment device of the payer PDPr for printing out the payment confirmation.

In order to provide the payee with a payment confirmation for the payee, the payment device of the payer PDPr performs a generation of an indirect payment confirmation message for the payee S9 comprising the payment confirmation for the payee. This message can be the combined payment confirmation message, which can be forwarded to the payment device of the payee PDPe in a later step. This implementation reduces processing expenses of the payment device of the payer PDPr and simplifies the procedure. Alternatively, the indirect payment confirmation message for the payee comprises solely the payment confirmation for the payee.

A transmission of the indirect payment confirmation message for the payee S10 is performed from the payment device of the payer PDPr to the payment device of the payee PDPe with the connection preferably established via an IR or a Bluetooth link although other interconnection techniques are feasible as described above.

On the payment device of the payee PDPe, the received indirect payment confirmation message for the payee is processed such that the extraction of the payment confirmation for the payee S11 from that message is carried out and the status information is indicated. Authenticity, integrity and non-repudiation of origin of the confirmation for the payee can be ensured by a security mechanism, e.g. analysing the hashing value, decryption, or by checking the validity of a digital signature and a certificate of the trusted third party TTP.

A second embodiment of the invention is depicted in FIGS. 2a and 2b with the corresponding processes and message flows between the payment device of the payee PDPe, the payment device of the payer PDPr, and the trusted third party TTP. The first five steps S1-S5 of the current embodiment are identical compared to the corresponding steps of the first embodiment according to FIGS. 1a/b. However, the content of the corresponding messages may have to be adapted to the requirements of the second embodiment and therefore may differ from the content of the messages of the first embodiment.

In contrast to the first embodiment described in FIG. 1, the trusted third party TTP provides the payer and the payee directly with separate confirmation messages. The trusted third party TTP performs a generation of the payment confirmation message for the payer S16 comprising status information of the payment transaction for the payer and a generation of the payment confirmation message for the payee S19 comprising status information of the payment transaction for the payee. A transmission of the payment confirmation message for the payer S17 and a transmission of the payment confirmation message for the payee S20 is established from the trusted third party TTP to the payment device of the payer PDPr and to the payment device of the payee PDPe, respectively, preferably via a link provided by a mobile communication network, or via Bluetooth or IR, respectively. An extraction of the payment confirmation for the payer S18 and an extraction of the payment confirmation for the payee S21 is performed by the payment device of the payer PDPr and the payment device of the payee PDPe, respectively. Indication of the status information comprised in the corresponding messages on the payment device of the payer PDPr or the payment device of the payee PDPe, respectively, can be implemented. It is obvious, that encryption or signature of one or more messages or confirmations enhances the security of the payment procedure.

Figure 2:
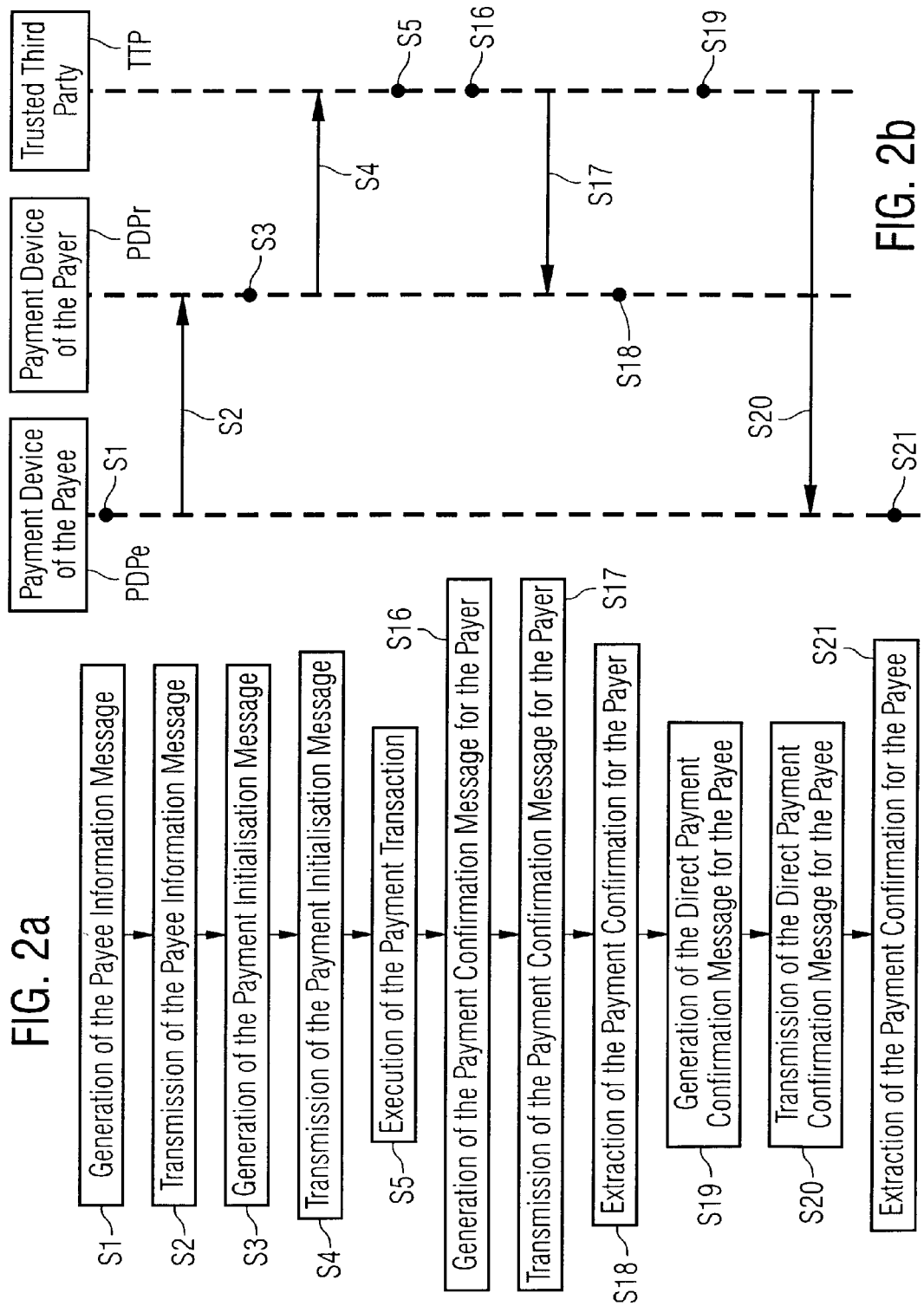
FIG. 2a shows a flow-chart diagram of a second embodiment of the present invention.
FIG. 2b shows messages and processes of the second embodiment of the present invention.

The specific sequence of the steps in FIG. 2 is only an example and other arrangements are possible. Depending on the implementation or case, the generation of the payment confirmation message for the payer S16 and the generation of the payment confirmation of the payee S19 can be executed in parallel. The same may be applicable for the transmission of the corresponding messages.

The indirect and the direct confirmation transmission procedure can be combined. Depending on the implementation or case, a decision on which confirmation transmission procedure is executed, can be made by one of the three parties. In a preferred embodiment, the payment device of the payee PDPe can indicate in the payee information message if either an indirect confirmation transmission procedure utilising a combined payment confirmation message and an indirect payment confirmation message for the payee according to FIG. 1 or a direct confirmation transmission procedure utilising a payment confirmation message for the payer and a direct payment confirmation message for the payee according to FIG. 2 is executed in the further procedure. This preference setting enables the payee to decide, e.g. if he prefers a more cost-effective or more secure implementation of the method, respectively.

Figure 3:
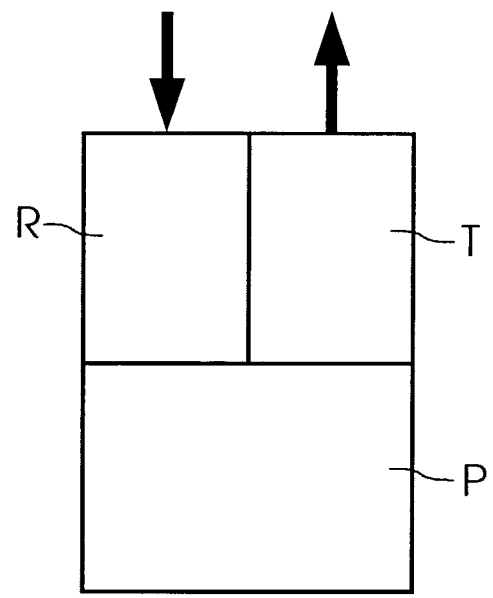
FIG. 3 schematically illustrates a payment device of the payer or the payee.

FIG. 3 depicts a schematic diagram of the payment device of the payer PDPr and/or the payee PDPe. As the basic functionality of both devices is very similar, both devices are described in parallel. The payment device comprises a receiver R, a transmitter T and a processing unit P. Other functions which are not essential for explaining the method but required for the operation are obvious for a skilled person.

Examples are a power source or elements for the terminal-user interaction, e.g. buttons, loudspeakers, microphones, or displays.

The receiver R is adapted to receive messages thus providing an input interface adapted either to a wireless connection environment, e.g. IR, Bluetooth, or a mobile communication system like GSM or UMTS, or to a wired connection environment, like the Internet or fixed telephone networks as PSTN or ISDN. As already indicated in the examples given above, the receiver R may incorporate also a combination of two or more of such connection interfaces, e.g. Bluetooth and GSM, or IR, UMTS, and connection via the Internet or other combinations if practical.

The transmitter T is adapted to send messages thus providing an output interface to a wireless and/or to a wired connection environment. Again, any kind of combination of two or more connection interfaces can be implemented, e.g. Bluetooth and GSM or similar.

Preferably, a receiver R and a transmitter T of the same type of connection interface can be implemented as a transceiver adapted to receive and to transmit messages. For example, an IR receiver and an IR transmitter are typically realised by a common IR transceiver.

The arrangement of interfaces of the payment device of the payer PDPr can be identical or differ from that of the payment device of the payee PDPe. In the first embodiment according to FIG. 1, the payment device of the payee PDPe may utilise a Bluetooth transceiver for the communication with the payment device of the payer PDPr. Beside that, the payment device of the payer PDPr has also to exchange messages with the trusted third party TTP. Following the present example, the payment device of the payer PDPr incorporates a Bluetooth transceiver for the communication with the payment device of the payee PDPe and one or more alternative interfaces for the exchange of messages with the trusted third party TTP which typically uses different types of connections for external communication.

The processing unit P is adapted to process messages and information, e.g. to generate messages, to analyse messages, to extract information from messages, and to apply encryption or signatures to messages or confirmations. It comprises a processor and may also include a memory or have access to an external memory, e.g. to store payment relevant data of the payer or the payee.

Within the payment device, receiver R, transmitter T and processing unit P are connected such that incoming messages received by the receiver R are guided to the processing unit P, whereas outgoing messages originating from the processing unit P are transferred to the transmitter T for further transmission to the intended recipient.

Figure 4:
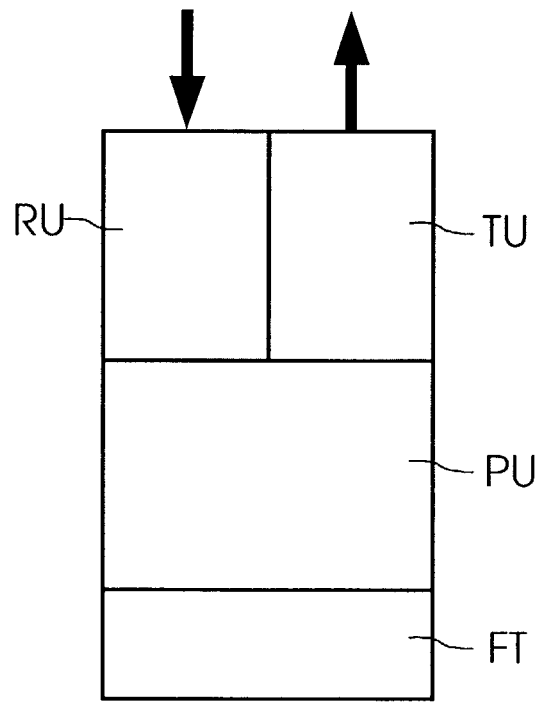
FIG. 4 schematically depicts the trusted third party.

FIG. 4 depicts a schematic diagram of a trusted third party TTP comprising a receiving unit RU, a transmitting unit TU, a processing unit PU, and a unit for financial transactions FT. As in FIG. 3, functions that are not essential for explaining the method but required for the operation of the device are not depicted.

The receiving unit RU as well as the transmitting unit TU preferably receive and transmit messages, respectively, via a communication network connectable to the core network of a mobile communication system, like GSM or UMTS. However, communication with the payment device of the payer PDPr as well of the payment device of the payee PDPe can be achieved also by other interconnection techniques as the Internet, PSTN, ISDN, or even Bluetooth or IR as explained before.

The processing unit PU is adapted to process a payment initialisation message comprising payment relevant data of the payer and the payee with the payment initialisation message preferably complying with a banking standard, e.g. HBCI or similar. Furthermore, the processing unit PU is adapted to activate the execution of a payment transaction S5 according to the payment initialisation message by the unit for financial transactions FT. In addition, the processing unit PU is adapted to generate a payment confirmation for the payer indicating a status information of the payment transaction for the payer and a payment confirmation for the payee indicating a status information of the payment transaction for the payee and subsequently to integrate those payment confirmations into one combined payment confirmation message. Alternatively, the processing unit PU is adapted to generate two separate payment confirmation messages according to the second embodiment of the method depicted with respect to FIG. 2. In addition, the processing unit PU can be adapted to apply security mechanisms, e.g. to perform encryption, decryption or signing of messages or confirmations.

The unit for financial transactions FT is adapted to perform a transfer of financial value from an account of a payer to an account of a payee based on specific input data, preferably supplied by the processing unit PU of the trusted third party TTP. As mentioned earlier, the unit for financial transactions FT typically generates a confirmation indicating the status of the transaction which can be used by the processing unit PU of the trusted third party TTP for the generation of the payment confirmation for the payer and for the payee.

Within the trusted third party TTP, the receiving unit RU, the transmitting unit TU, and the processing unit PU are connected such that incoming messages received by the receiving unit RU are guided to the processing unit PU, whereas outgoing messages originating from the processing unit PU are transferred to the transmitting unit TU for transmission to the intended recipient. The processing unit PU is furthermore connected to the unit for financial transactions FT in order to activate the payment transaction and to receive a status information on the payment transaction.

The above embodiments admirably achieve the objects of the invention. However, it will be appreciated that departures can be made by those skilled in the art without departing from the scope of the invention which is limited only by the claims.

The invention claimed is:

1. A method for transferring financial value from a payer to a payee, wherein a payment device of the payer contacts a trusted third party for activating a payment transaction of the financial value and the trusted third party provides a payment confirmation for the payer comprising the status of the payment transaction for the payer as well as a payment confirmation for the payee comprising the status of the payment transaction for the payee, wherein the following steps are performed:

generation of a payee information message by a payment device of the payee with the payee information message comprising payment relevant data of the payee;

transmission of the payee information message to the payment device of the payer;

generation of a payment initialisation message by the payment device of the payer with the payment initialisation message comprising payment relevant data of the payer and the payee for activating the payment transaction at the trusted third party;

transmission of the payment initialisation message to the trusted third party;

processing of the payment initialisation message and execution of the payment transaction of the financial value from an account of the payer to an account of the payee by the trusted third party;

generation of the payment confirmation for the payer and the payment confirmation for the payee by the trusted third party;

execution of a confirmation transmission procedure, wherein the payment confirmation for the payer is transmitted to the payment device of the payer and the payment confirmation for the payee is transmitted to the payment device of the payee, said confirmation transmission procedure comprising the steps of:

generation of a combined payment confirmation message by the trusted third party with the combined payment confirmation message comprising the payment confirmation for the payer and the payment confirmation for the payee;

transmission of the combined payment confirmation message to the payment device of the payer;

processing of the combined payment confirmation message by the payment device of the payer and extraction of the payment confirmation for the payer;

generation of an indirect payment confirmation message for the payee by the payment device of the payer with the indirect payment confirmation message for the payee comprising the payment confirmation for the payee;

transmission of the indirect payment confirmation message for the payee to the payment device of the payee;

processing of the indirect payment confirmation message for the payee by the payment device of the payee and extraction of the payment confirmation for the payee.

2. The method according to claim 1, wherein the combined payment confirmation message comprises the payment confirmation for the payer concatenated with the payment confirmation for the payee and a hashing digest of the concatenation.

3. The method according to claim 1, wherein the confirmation transmission procedure comprises the following steps:

generation of a payment confirmation message for the payer by the trusted third party with the payment confirmation message for the payer comprising the payment confirmation for the payer;

transmission of the payment confirmation message for the payer to the payment device of the payer;

processing of the payment confirmation message for the payer and extraction of the payment confirmation for the payer;

generation of a direct payment confirmation message for the payee by the trusted third party with the direct payment confirmation message for the payee comprising the payment confirmation for the payee;

transmission of the direct payment confirmation message for the payee to the payment device of the payee;

processing of the direct payment confirmation message for the payee and extraction of the payment confirmation for the payee.

4. The method according to claim 1, characterised in that the payment initialisation message complies with the Home Banking Computer Interface (HBCI) standard or the Open Finance Exchange (OFX) standard or the Interactive Financial Exchange (IFX) standard.

5. The method according to claim 1, wherein an encryption or signature is applied to at least one of the messages or confirmations.

6. The method according to claim 1, characterised in that at least one of the messages is sent over a mobile communication system.

7. The method according to any of the claims 1, characterised in that at least one of the messages is sent over an InfraRed (IR) link or a Bluetooth link.

8. The method according to claim 1, wherein the payment confirmation for the payer or the payment confirmation for the payee comprises a status information from a group indicating an
   erroneous payment transaction, or
   a successful payment transaction, or a
   further processing of the payment transaction.

9. A payment device for a payer, comprising
   a transmitter for sending messages;
   a receiver for receiving messages;
   a processing unit for processing of information and messages, wherein the receiver is adapted to receive a payee information message comprising payment relevant data of a payee;
   the processing unit is adapted to perform a generation of a payment initialisation message comprising payment relevant data of the payer and the payee for activating a payment transaction;
   the transmitter is adapted to send the payment initialisation message to a trusted third party;
   the receiver is adapted to receive a confirmation message comprising a payment confirmation for the payer indicating the status of the payment transaction for the payer, said confirmation message further comprises a payment confirmation for the payee indicating the status of the payment transaction for the payee;
   the processing unit is adapted to perform an extraction of the payment confirmation for the payer from that confirmation message;
   the processing unit is adapted to perform a generation of an indirect payment confirmation message for the payee comprising the payment confirmation for the payee; and,
   the transmitter is adapted to send the indirect payment confirmation message for the payee to the payment device of the payee.

10. The payment device according to claim 9, wherein the processing unit is adapted to generate the payment initialisation message complying with the Home Banking Computer Interface (HBCI) standard or the Open Finance Exchange (OFX) standard or the Interactive Financial Exchange (IFX) standard.

11. The payment device according to claim 9, wherein the processing unit is adapted to analyse a hashing digest of a concatenation of the payment confirmation for the payer and the payment confirmation for the payee.

12. The payment device according to claim 9, wherein the processing unit is adapted to apply an encryption or signature to at least one message or confirmation or to process encrypted or signed messages or confirmations.

13. The payment device according to claim 9, characterised in that the payment device is a terminal of a mobile communication system.

14. The payment device according to claim 9, characterised in that the payment device is adapted to send or receive InfraRed (IR) or Bluetooth messages.

* * * * *